United States Patent
O'Sullivan et al.

(10) Patent No.: US 9,823,136 B2
(45) Date of Patent: Nov. 21, 2017

(54) TEMPERATURE SENSOR HAVING A COVER LAYER WITH ALUMINUM OXIDE, SILICON OXIDE, YTTRIUM OXIDE AND BORON OXIDE

(71) Applicant: Sensata Technologies Bermuda Ltd., Hamilton (BM)

(72) Inventors: Katherine O'Sullivan, Farranfore (IE); Anthony Herlihy, Tralee (IE); Anthony Maher, Foynes (IE); Balasubramaniam Vaidhyanathan, Leicestershire (GB); Yang Chen, Changchun (CN)

(73) Assignee: SENSATA TECHNOLOGIES BERMUDA LTD, Hamilton (BM)

( * ) Notice: Subject to any disclaimer, the term of this patent is extended or adjusted under 35 U.S.C. 154(b) by 462 days.

(21) Appl. No.: 14/534,419

(22) Filed: Nov. 6, 2014

(65) Prior Publication Data

US 2015/0131702 A1  May 14, 2015

(30) Foreign Application Priority Data

Nov. 13, 2013 (DE) .......... 10 2013 112 493

(51) Int. Cl.
| | |
|---|---|
| *G01K 1/08* | (2006.01) |
| *G01K 1/12* | (2006.01) |
| *G01K 7/18* | (2006.01) |
| *H01C 7/02* | (2006.01) |

(52) U.S. Cl.
CPC .............. *G01K 7/183* (2013.01); *G01K 1/08* (2013.01); *G01K 1/12* (2013.01); *G01K 7/18* (2013.01); *H01C 7/021* (2013.01)

(58) Field of Classification Search
CPC .. G01K 1/08; G01K 1/12; G01K 7/18; G01K 7/183; H01C 7/008; H01C 7/021; H01C 17/02
See application file for complete search history.

(56) References Cited

U.S. PATENT DOCUMENTS

| | | | | |
|---|---|---|---|---|
| 3,859,102 | A * | 1/1975 | Fearns | C03C 3/108 501/23 |
| 5,252,521 | A * | 10/1993 | Roberts | C03C 8/04 501/17 |
| 5,948,348 | A * | 9/1999 | Semff | C04B 35/589 264/257 |
| 6,007,743 | A * | 12/1999 | Asada | B22F 1/02 174/126.2 |
| 6,617,956 | B1 | 9/2003 | Zitzmann | |

(Continued)

FOREIGN PATENT DOCUMENTS

CN          202994323 U      6/2013

*Primary Examiner* — Randy Gibson
(74) *Attorney, Agent, or Firm* — Hackler Daghighian Martino & Novak

(57) ABSTRACT

A temperature sensor includes a substrate, a platinum resistor arranged on at least one surface of the substrate, a protective layer covering at least a portion of the platinum resistor and a cover layer covering at least a portion of the protective layer, the cover layer including Al2O3, SiO2 and Y2O3. The cover layer may also include B2O3. A conductive wire may be electrically connected to the platinum resistor. A glass ceramic may be covering at least a portion of the conductive wire, platinum resistor, protective layer and cover layer.

18 Claims, 1 Drawing Sheet

(56) References Cited

U.S. PATENT DOCUMENTS

| | | | |
|---|---|---|---|
| 6,776,838 B2* | 8/2004 | Hemmings | C03C 3/087 |
| | | | 106/711 |
| 7,233,226 B2 | 6/2007 | Zitzmann | |
| 7,233,262 B2 | 6/2007 | Tomioka | |
| 7,280,028 B2* | 10/2007 | Nelson | G01K 7/18 |
| | | | 338/25 |
| 8,419,275 B2* | 4/2013 | Nakayama | G01K 1/10 |
| | | | 374/185 |
| 9,212,087 B2* | 12/2015 | Yano | C03C 3/091 |
| 2004/0202227 A1* | 10/2004 | Nelson | G01K 7/18 |
| | | | 374/208 |
| 2006/0139144 A1* | 6/2006 | LaBarge | G01K 7/16 |
| | | | 338/308 |
| 2007/0024414 A1* | 2/2007 | Beckmeyer | G01K 1/10 |
| | | | 338/25 |
| 2007/0294881 A1 | 12/2007 | Nelson et al. | |
| 2009/0318279 A1* | 12/2009 | Hemmings | C03C 3/087 |
| | | | 501/53 |
| 2011/0136302 A1 | 6/2011 | Yamazaki | |
| 2012/0063488 A1* | 3/2012 | Nakayama | G01K 1/10 |
| | | | 374/185 |

\* cited by examiner

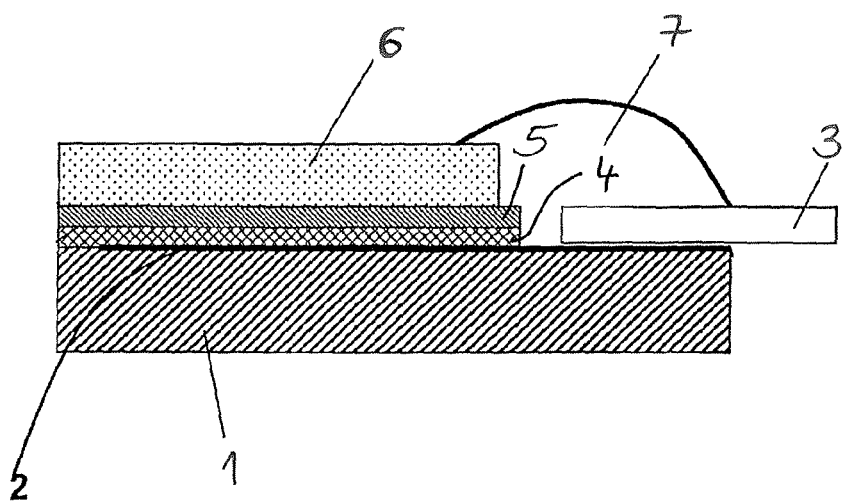

us 9,823,136 B2

TEMPERATURE SENSOR HAVING A COVER LAYER WITH ALUMINUM OXIDE, SILICON OXIDE, YTTRIUM OXIDE AND BORON OXIDE

CROSS-REFERENCE TO RELATED APPLICATIONS

This application claims priority to German Patent Application No. 10 2013 112 493.3, filed Nov. 13, 2013, the entire contents of which are hereby incorporated by reference.

DESCRIPTION

Field of the Invention

The present invention generally relates to an improved temperature sensor.

BACKGROUND OF THE INVENTION

An embodiment of the invention is based on a temperature sensor having the features listed in the claims. Prior art temperature sensors are known from US 6,617,956 B1 and US 7,233,226 B2.

US 6,617,956 B1 and US 7,233,226 B2 disclose temperature sensors comprising a platinum resistor that is arranged on a substrate and covered by a protective ceramic layer of $Al_2O_3$. The thin protective layer is covered by a thicker covering layer that is a mixture of $Al_2O_3$, MgO and $SiO_2$. The known temperature sensors can only be used at temperatures up to 1000° C. and show significant resistance drift after extended use at such elevated temperatures.

An object of the present invention is to show how the temperature resistance of such sensors can be improved and resistance drift lowered. This problem, and other problems, may be solved by a temperature sensor according to the claims. Further advantageous refinements of the invention may be the matter of the dependent claims.

SUMMARY OF THE INVENTION

An increase in temperature resistance is achieved with a temperature sensor comprising a substrate, a platinum resistor arranged on the substrate, a protective layer covering the platinum resistor, and a cover layer covering the protective layer in that the cover layer contains $Al_2O_3$, $SiO_2$, and $Y_2O_3$. By adding $Y_2O_3$ to $Al_2O_3$ and $SiO_2$ a cover layer can be provided that results in significantly reduced layer diffusion. The cover layer is thus less prone to pore formation and can provide a reliable seal up to higher temperatures. Moreover, reduced layer diffusion means that contact between material of the cover layer and the platinum resistor can be prevented up to higher temperatures and thus resistance shift reduced.

A rather small amount of $Y_2O_3$ is sufficient to improve the heat resistance of a layer that consists predominantly of $Al_2O_3$ and $SiO_2$. For example, the cover layer may contain 5% by weight of $Y_2O_3$ or more. In an embodiment of the invention, the cover layer may contain 10% by weight of $Y_2O_3$ or more. Increasing the concentration of $Y_2O_3$ beyond 30% by weight does not improve the cover layer significantly and may not be economical. An embodiment of the invention may be that the cover layer contains less than 20% by weight of $Y_2O_3$.

Another embodiment of the invention may be that $SiO_2$ and $Al_2O_3$ together add up to at least 50% by weight of the cover layer, for example 60% by weight or more.

Another embodiment of the invention may be that the cover layer contains more $SiO_2$ by weight than $Al_2O_3$. For example, the cover layer can contain twice as much $SiO_2$ by weight than $Al_2O_3$ or more.

Another embodiment of the invention is that the cover layer contains less $Y_2O_3$ by weight than $Al_2O_3$. Another embodiment of the invention is that the cover layer contains more $SiO_2$ by weight than $Y_2O_3$.

The cover layer may contain at least 30% by weight of $SiO_2$, for example 40% by weight or more. A $SiO_2$ content of more than 70% is usually not advantageous.

The cover layer may contain at least 15% by weight of $Al_2O_3$, for example 20% weight or more. An $Al_2O_3$ content of more than 30% is usually not advantageous.

The cover layer may also contain $B_2O_3$, e.g. up to 25% by weight. For example, in an embodiment of invention the cover layer may contain 1% by weight to 20% by weight of $B_2O_3$. The cover layer may also contain additional additives, especially other oxides besides $SiO_2$, $Al_2O_3$, $Y_2O_3$ and $B_2O_3$. In a possible embodiment of the invention, the content of any additional additives may be less than 20% by weight in total, for example not more than 10% by weight.

BRIEF DESCRIPTION OF THE DRAWINGS

The accompanying drawings illustrate the invention. In such drawings:

FIG. 1 shows a schematical cross-section of an embodiment of a temperature sensor.

DETAILED DESCRIPTION OF THE PREFERRED EMBODIMENTS

An embodiment of a temperature sensor shown in FIG. 1 comprises a substrate 1, for example an alumina substrate. A platinum resistor 2, which may be connected to a wire 3, is arranged on the substrate 1. The platinum resistor 2 is a resistive layer and may be made of any platinum metal or platinum metal based alloy. The platinum resistor 2 is covered by a protective layer 4, for example a ceramic layer. The protective layer 4 can be made of alumina or other ceramic material. A cover layer 5 is arranged on top of the protective layer 4. The cover layer 5 can be covered by an additional layer 6, e.g. a glaze layer. A connection area of the wire 3 and the platinum resistor 2 may be covered by a glass ceramic 7 in order to secure and protect the connection between lead wire 3 and platinum resistor 2.

The cover layer 5 may be a glass ceramic or glaze layer. The cover layer 5 contains $SiO_2$, $Al_2O_3$, and $Y_2O_3$. For example, the cover layer 5 may contain 40 to 60% by weight of $SiO_2$, 20 to 25% by weight of $Al_2O_3$, and 10 to 19% by weight of $Y_2O_3$. The cover layer 5 may also contain up to 20% by weight of $B_2O_3$, e.g. 5% to 20% by weight of $B_2O_3$, and up to 20% by weight of other components, especially other oxides. Such a temperature sensor can be used for measuring temperatures up to 1200° C.

The protective layer 4 can be applied by a vapour deposition method or as a green foil that is later fired. The cover layer 5 can be produced by a screen-printing method, for example. In the embodiment of FIG. 1, which is not to scale, the cover layer 5 is thicker than the protective layer 4. If an additional layer 6 is placed on top of the cover layer 5, this additional layer 6 may be even thicker than the cover layer 5. Any additional layer 6 may be applied as a paste, e.g. by printing and later fired. The thickness of the various layers may not be critical for the functioning of the temperature sensor and may be chosen for manufacturing considerations.

REFERENCE NUMERALS

1 Substrate
2 Platinum resistor
3 Wire
4 Protective layer
5 Cover layer
6 Additional layer
7 Glass ceramic Although several embodiments have been described in detail for purposes of illustration, various modifications may be made to each without departing from the scope and spirit of the invention. Accordingly, the invention is not to be limited, except as by the appended claims.

What is claimed is:

1. A temperature sensor, comprising:
   a substrate;
   a platinum resistor arranged on the substrate;
   a protective layer covering the platinum resistor; and
   a cover layer covering the protective layer, the cover layer containing $Al_2O_3$ and $Si_2O$, wherein the cover layer also contains $Y_2O_3$ and $B_2O_3$:
   wherein the cover layer contains 30 to 70% by weight of $Si_2O$; and
   wherein the cover layer contains 1 to 20% by weight of $B_2O_3$.

2. The temperature sensor according to claim 1, wherein the cover layer contains at least 5% by weight of $Y_2O_3$.

3. The temperature sensor according to claim 1, wherein the cover layer contains at least 10% by weight of $Y_2O_3$.

4. The temperature sensor according to claim 1, wherein the cover layer contains more $Si_2O$ by weight than $Al_2O_3$.

5. The temperature sensor according to claim 1, wherein the cover layer contains more $Al_2O_3$ by weight than $Y_2O_3$.

6. The temperature sensor according to claim 1, wherein the cover layer contains less than 30% by weight of $Y_2O_3$.

7. The temperature sensor according to claim 1, wherein the cover layer contains less than 20% by weight of $Y_2O_3$.

8. The temperature sensor according to claim 1, wherein the cover layer contains 15 to 30% by weight of $Al_2O_3$.

9. The temperature sensor according to claim 1, wherein the cover layer contains 20 to 25% by weight of $Al_2O_3$.

10. The temperature sensor according to claim 1, wherein the cover layer contains 40 to 60% by weight of $Si_2O$.

11. The temperature sensor according to claim 1, wherein the cover layer contains 1 to 25% by weight of $B_2O_3$.

12. The temperature sensor according to claim 1, wherein the cover layer contains less than 20% by weight of components that are not $Al_2O_3$, $Si_2O$, $Y_2O_3$, nor $B_2O_3$.

13. The temperature sensor according to claim 1, wherein the cover layer contains less than 10% by weight of components that are not $Al_2O_3$, $Si_2O$, $Y_2O_3$, nor $B_2O_3$.

14. The temperature sensor according to claim 1, wherein the cover layer is a glaze layer.

15. A temperature sensor, comprising,
    a substrate;
    a platinum resistor arranged on the substrate;
    a protective layer covering the platinum resistor; and
    a cover layer covering the protective layer, the cover layer containing $Al_2O_3$ and $Si_2O$, wherein the $Si_2O$ is 30 to 70% by weight, wherein the cover layer also contains $Y_2O_3$ and contains 1 to 20% by weight of $B_2O_3$;
    wherein the cover layer protects the temperature sensor above 1000° C., the temperature sensor configured to measure temperatures up to 1200° C.

16. A temperature sensor, comprising:
    a substrate;
    a platinum resistor arranged on at least one surface of the substrate;
    a protective layer covering at least a portion of the platinum resistor; and
    a cover layer covering at least a portion of the protective layer, the cover layer comprising $Al_2O_3$, $Si_2O$, $Y_2O_3$ and $B_2O_3$
    wherein the cover layer contains 1 to 20% by weight of $B_2O_3$;
    wherein the cover layer contains 30 to 70% by weight of $Si_2O$; and
    wherein the cover layer protects the temperature sensor above 1000° C., the temperature sensor configured to measure temperatures up to 1200° C.

17. The temperature sensor of claim 16, including a conductive wire electrically connected to the platinum resistor.

18. The temperature sensor of claim 17, including a glass ceramic covering at least a portion of the conductive wire, platinum resistor, protective layer and cover layer.

* * * * *